United States Patent [19]

Musy

[11] 4,445,560
[45] May 1, 1984

[54] TIRE, PARTICULARLY FOR AIPLANES, WITH CROWN REINFORCEMENT OF TEXTILE CABLES AND PROCESS FOR THE MANUFACTURE THEREOF

[75] Inventor: Jacques Musy, Clermont-Ferrand, France

[73] Assignee: Compagnie Generale des etablissements Michelin, Clermont-Ferrand, France

[21] Appl. No.: 346,127

[22] Filed: Feb. 5, 1982

[30] Foreign Application Priority Data

Feb. 12, 1981 [FR] France .................. 81 02789

[51] Int. Cl.³ ................ B60C 9/00; B29H 5/02
[52] U.S. Cl. .................... 152/200; 57/902; 152/209 R; 152/353 C; 152/356 R; 152/359; 152/361 DM; 264/315; 264/326
[58] Field of Search ..... 152/361 DM, 361 R, 361 FP, 152/356 R, 352 R, 353 R, 353 C, 354 R, 354 RB, 359, 200, 198; 156/110 R, 110 C, 123 R; 428/295, 902; 244/103 R; 57/243, 244, 902; 264/315, 316, 342 R, 326

[56] References Cited

U.S. PATENT DOCUMENTS

| | | | |
|---|---|---|---|
| 3,559,714 | 2/1971 | Verdier | 152/361 DM |
| 3,786,851 | 1/1974 | Mirtain et al. | 152/361 DM |
| 3,831,656 | 8/1974 | Senger et al. | 152/361 DM X |
| 4,258,775 | 3/1981 | Samoto | 152/361 DM X |

Primary Examiner—William A. Powell
Assistant Examiner—Thomas Bokan
Attorney, Agent, or Firm—Brumbaugh, Graves, Donohue & Raymond

[57] ABSTRACT

When this airplane tire is mounted on its rim, its carcass reinforcement has a relative camber of convexity before inflation which is at most equal to 0.17 in the crown and at most equal to 0.20 in the sidewalls. After inflation, the equilibrium curve of this carcass reinforcement is, at the level of the shoulders of the tire, located radially outwards of its equilibrium curve in the tire before inflation.

The cables of the lateral plies of the tripartite crown reinforcement are very extensible and have a high coefficient of contraction under the heat at the temperature of vulcanization of the tire.

18 Claims, 3 Drawing Figures

TIRE, PARTICULARLY FOR AIPLANES, WITH CROWN REINFORCEMENT OF TEXTILE CABLES AND PROCESS FOR THE MANUFACTURE THEREOF

The present invention relates to tires, particularly for airplanes, whose reinforcement is formed, on the one hand, by a carcass reinforcement formed of at least one ply of radial cables which is anchored to at least one bead ring in each bead, and, on the other hand, by a crown reinforcement formed of cables of textile materials which is arranged radially outwards of the carcass reinforcement. The invention relates in particular to means and methods of manufacturing such tires.

The standards relating, for instance, to airplane tires establish, for a tire corresponding to given dimensions, inflation pressure and static load, the maximum axial width and the radial height on the rim or, stated differently, the dimensions of the sides of the rectangle within which the meridian profile of this tire must be inscribed. In general, it would appear that in order to minimize heating in the crown as well as wear in particular of the edges of the tread of a tire, it is advisable to impart to this tire a meridian profile which comes as close as possible to the limits of a rectangular contour, such as that referred to above.

For this purpose, the tire can, for instance, be vulcanized in a mold which imparts not only to the outer contour but also to the reinforcement, as a result of the pressure of the vulcanization chamber or bag, a meridian curvature which, from a maximum very high value at the level of the shoulders, decreases rapidly in the direction both towards the equatorial plane and towards the sidewalls of the tire.

However, at high speeds, stationary waves rapidly occur on such a tire and the tire is of short life.

This drawback appears to be caused by the absence of tensions in the marginal regions of the crown reinforcement of textile cables and even more by the absence of sufficient tension under the effect of the inflation pressure. As a matter of fact, under the influence of the inflation pressure the reinforcement does not retain a meridian profile identical to the one which it has in the vulcanization mold. The maximum curvature at the level of the shoulders tends to decrease in favor of increases in the equatorial diameter and in the maximum axial width of the reinforcement of the tire. This results in insufficient tension or even compression in the marginal zones of the crown reinforcement.

Therefore, the object of the present invention is both to maintain a quasi-rectangular meridian profile of the tire and its reinforcement and to obtain a delay in, or even elimination of, the formation of stationary waves on the tire, this two-fold purpose being reached without recourse to additional reinforcement plies.

In accordance with French Pat. No. 2,141,557, two additional crossed plies of elastic cables forming angles of at most 30° with the cables of the carcass reinforcement are arranged radially inward of the carcass reinforcement in the region of the shoulders. However, this is a tire, on the one hand, for very heavy earthmoving equipment which, on the other hand, has a crown reinforcement of metal cables which are therefore resistant to circumferential contraction in the marginal zones.

For the purposes of the invention, there qualifies as a tire of quasi-rectangular meridian profile after mounting on its service rim and inflation to its service pressure any tire whose carcass reinforcement has a relative camber of convexity in the crown of at most 0.12, preferably between 0.04 and 0.10, and a relative camber of convexity in the sidewalls of at most 0.14.

By convention, for the purposes of this invention the relative camber of convexity in the crown is defined on a meridian section of a tire (See FIG. 1). One considers the circular arc C which passes, on the one hand, through the equatorial point S at which the carcass reinforcement 2 intersects the trace ZZ' of the equatorial plane of the tire and, on the other hand, through the two points of intersection A and A' of the carcass reinforcement with the traces E and E' of planes parallel to the equatorial plane, each located at an axial distance from the equatorial plane which is equal to 0.3 times the maximum axial width L of the contact area of the tire. This maximum axial width L is measured on the tire mounted on its service rim, inflated to its service pressure, bearing its rated load and resting without lateral inclination on flat horizontal ground. The relative camber of convexity in the crown is the ratio $f_s/L$, $f_s$ being the radial distance between the equatorial point S and the points of intersection D, D' of the circular arc C with the lines F, F' parallel to the trace ZZ' of the equatorial plane which are located at the ends of the maximum axial width L of the contact area of the tire and L being the maximum axial width of the contact area of the tire.

The relative camber of convexity in the sidewalls is the ratio $f_f/(R_s - R_j)$, $f_f$ being equal to $(B-L)/2$, B being the maximum axial width of the carcass reinforcement 2 (such as, for instance, 0.975 times the maximum axial width $B_1$ of the tire which is stipulated in the standards), L being the maximum axial width of the contact area of the tire, $R_s$ being the equatorial radius of the carcass reinforcement 2 and $R_j$ being the radius at the bead seat on the rim J (radius stipulated in the standards) of the tire mounted on its service rim, inflated to its service pressure, but not under load.

In order to achieve the above-indicated two-fold purpose, the invention provides a tire for airplanes having a carcass reinforcement formed of at least one ply of radial cables which is anchored to at least one bead ring in each bead and a tripartite crown reinforcement radially outwards adjacent to the carcass reinforcement and having a median portion in contact, at each of its edges, with a lateral portion, each of these three portions being formed of at least one ply of textile cables which are parallel in each ply and inclined at an angle of between 0° and 30° to the circumferential direction of the tire, the carcass reinforcement of the tire when mounted on its service rim and inflated to its service pressure but not under load having a relative camber of convexity in the crown of at most 0.12, preferably between 0.04 and 0.10, and a relative camber of convexity in the sidewalls of at most 0.14, the tire thus having a quasi-rectangular meridian profile and being characterized by the fact that when it is mounted on its service rim but not inflated, its carcass reinforcement has, on the one hand, a relative camber of convexity in the crown of at most 0.17, preferably between 0.055 and 0.15, and a relative camber of convexity in the sidewalls of at most 0.20, and, on the other hand, a length such that after inflation its equilibrium curve at the level of the shoulders is located radially outwards of its curve in the uninflated tire, and by the fact that the median portion of the crown reinforcement is formed of cables whose extensibility is low, preferably close to zero, and which have a low, preferably zero, coefficient of contraction under the heat at the temperature of vulcanization of the tire, while the cables of the lateral portions of the crown reinforcement are very extensible and have a high coefficient of contraction under the heat at the temperature of vulcanization of the tire.

Due, on the one hand, to the differences in extensibility between the median portion and the lateral portions of the crown reinforcement in accordance with the invention and, on the other hand, to the appropriate length of the carcass reinforcement, the latter tends, under the effect of the service pressure, to assume a meridian profile, the curvature of which is high and maximum at the level of the shoulders of the tire, while the relative camber of convexity of the carcass reinforcement in the sidewalls and the relative camber of convexity of the carcass reinforcement in the crown decrease to assume values of less than 0.14 and 0.12, respectively.

The obtaining of a quasi-rectangular profile of the reinforcement of the tire of the invention under the effect of the service pressure results in a substantial radial expansion of the tire at the level of the shoulders. This expansion creates, within the cables of the lateral portions of the crown reinforcement, a very substantial additional tension as compared with the practically zero or even negative tensions present in the edges of the known crown reinforcements. This additional tension cooperates with the intentionally high extensibility of the lateral regions of the crown reinforcement to delay or prevent the occurrence of stationary waves at high speeds.

Contrary to the centrifugal radial expansion acting solely on the mass of the crown, stationary waves are a vibratory phenomenon which is not only superimposed on the radial expansion but is related to the flattening of the crown in the contact area and is produced above a frequency, that is to say a speed, of rotation by the movement of the masses present. The movement of these masses delays the return of the flattened tire to its unflattened shape prior to the passage of the portion of the tire under consideration into the contact area. Numerous means (for instance, U.S. Pat. No. 2,958,359, French Pat. No. 2,121,736) have been devised in order circumferentially to stiffen the edges of the crown reinforcement and/or prevent the centrifugal radial expansion of the crown of highway tires. None of these means avoids the sudden reduction of the circumferential tension or even the appearance of a negative circumferential tension, that is to say of a compression, in the edges of the crown reinforcement. The momentary presence of a zero tension or of a compression combined with the intentional stiffness of the edges of the crown reinforcement makes the latter, and therefore the crown, incapable of at once recovering their previously unflattened shape, that is to say of opposing the development of stationary waves which persist and the number of which increases with the speed and tend to break up the crown of tires of the type in question.

For the manufacture of the tire of the invention recourse is had to a method which is characterized by the use, on the one hand, of a vulcanization mold in which the carcass reinforcement and the crown reinforcement occupy approximately the same position as in the tire when mounted on its service rim and inflated to its service pressure but not under load, the curvature of the carcass reinforcement reaching a maximum at the shoulders and a minimum at the intersection of the carcass reinforcement with the equatorial plane of the tire, the carcass reinforcement having a relative camber of convexity in the crown of at most 0.12, preferably between 0.04 and 0.10, and a relative camber of convexity in the sidewalls of at most 0.14, and by the use, on the other hand, of a crown reinforcement in which the cables of the median portion have a low extensibility, preferably close to zero, and have a coefficient of contraction under the heat at the temperature of vulcanization of the tire which is low, preferably zero, and in which the cables of the lateral portions are very extensible and have a high coefficient of contraction under the heat at the temperature of vulcanization of the tire.

The principle of this method consists in utilizing the influence of the heat at the temperature of vulcanization on a crown reinforcement formed of a median portion reinforced by cables of low, if not zero, extensibility consisting of a material preferably having a low or zero coefficient of contraction under this heat, and of two lateral portions reinforced by very extensible cables of a material having a high coefficient of contraction under this heat, this within a vulcanization mold in which the reinforcement of the tire occupies approximately the same contour as in the tire when mounted on its service rim and inflated to its service pressure, this contour reaching a maximum of curvature at the shoulders and tending towards a minimum at the equator of the crown.

The tension stored as a result of the thermal contraction of the median portions of the crown reinforcement then results in a falling inward of the shoulders of the tire after extraction from the mold. Finally, due to the elasticity of the lateral portions and the practically non-deformability of the median portion of the crown reinforcement, the service pressure causes an expansion and therefore a very extensive circumferential increase in tension in the outer edges of the lateral portions of the crown reinforcement. The substantially increased tension and elasticity of the edges together play the role of retarder, if not inhibiter, of the formation of stationary waves. If in a tire of the type claimed, the circumferential tension of the crown reinforcement per unit of width (axial) is equal to about $\dot{P} \cdot R$ (P=service inflation pressure; R=equatorial radius) at the level of the equator, the tension in the edges of the crown reinforcement in accordance with the invention is more than 0.15 times, preferably 0.20 times, and may reach 0.6 times this equatorial tension.

A first preferred variant of the tire of the invention consists in the fact that in the median portion of the crown reinforcement the cables have a modulus of elasticity of between 600 and 2500 daN/mm$^2$ measured at 25% of the rupture load, a relative elongation upon rupture of between 0.1% and 8% and a coefficient of contraction under the heat at the temperature of vulcanization of the tire of less than 0.75% of their length before the vulcanization of the tire.

A second preferred variant of the tire of the invention consists in the fact that in the lateral portions of the crown reinforcement the cables have a modulus of elasticity of between 75 and 600 daN/mm$^2$ measured at 80% of the rupture load, a relative elongation upon rupture of between 10% and 40%, preferably between 10% and 30%, and a coefficient of contraction under the heat at the temperature of of vulcanization of the tire of at least equal to 4 times the coefficient of contraction of the cables of the median portion and equal to between 3% and 15%, preferably between 6% and 10%, of their length before the vulcanization of the tire.

Preferably also the median portion of the crown reinforcement in a tire in accordance with the invention has an axial width of between 30% and 80% of the width of the crown reinforcement.

Furthermore, preferably, in a tire in accordance with the invention:

each lateral portion of the crown reinforcement has an axial width of between 10% and 35% of the width of the crown reinforcement;

the median portion of the crown reinforcement is formed of plies of cables oriented at 0° with respect to the circumferential direction of the tire;

the median portion of the crown reinforcement is formed of plies of cables which are crossed symmetrically at angles of less than 30° with respect to the circumferential direction of the tire;

the lateral portions of the crown reinforcement are formed of plies of cables oriented at 0° with respect to the circumferential direction of the tire;

the lateral portions of the crown reinforcement are formed of plies of cables which are crossed symmetrically at angles of less than 25° with respect to the circumferential direction of the tire;

the radial carcass reinforcement has a relative elongation under the effect of the service pressure of between 1% and 2% of its length in the mold;

a part of the ply of each of the lateral portions or at least one of the plies of each of the lateral portions is arranged radially outwards of a median ply in the zone of contact between the lateral and median portions so as to create a zone common (zone O in FIGS. 2 and 3) to the median portion and to each of the lateral portions;

the common zone between each lateral portion and the median portion of the crown reinforcement has an axial width at most equal to 15% of the width of the crown reinforcement.

Due to the fact that the extensibility of the cables produces, upon inflation of the tire to service pressure, a substantial displacement of the shoulders towards the outside and, contrary to the known arrangements, the purpose of which is to stiffen the edges of the crown reinforcement, it is possible to extend into the sidewalls at least one ply of each of the lateral portions of the crown reinforcement without interfering with the flattening of the shoulders upon travel.

If one defines as convexity of the tread (surface) the relative difference, expressed in percent of the equatorial outer radius $R_{max}$ (See FIG. 1) with reference to the axis of rotation XX' of the tire inflated to its service pressure but not under load, between the equatorial radius and the arithmetic average of the radii $R_{ep}$ measured at the points of the tire surface where the area of contact reaches its maximum axial width L (as defined above), the invention makes it possible to manufacture tires having a tread convexity of between 0% and 6% and which have a satisfactory resistance to wear. When a tire according to the invention is mounted on its service rim but not inflated, this convexity is greater by at least 1.5%, preferably 3% to 4%, of the equatorial radius of the tire inflated to its service pressure than said convexity measured on the tire when inflated to its service pressure.

The coefficient of contraction under the heat of vulcanization of the tire of the cables of the crown reinforcement according to the invention is measured in accordance with ASTM Standard D 885 of 1973 on bare cables ready to be incorporated in the tire, under a tension of 4.5 g/tex at 180° C. after one minute of thermal stabilization.

In the event that, for certain uses, it is advisable to add to the crown reinforcement of the invention one or more customary crown plies, for example, protective plies of elastic cables, these plies are arranged radially outwards of the crown reinforcement of the invention. These customary crown plies preferably have a width approximately equal to the width of the median portion of the crown reinforcement of the invention. When these customary crown plies consist of elastic steel cables, it is advisable to arrange the cables at angles at least equal to 45° with respect to the circumferential direction of the tire.

The combinations of the basic method described above for the production of a tire according to the invention with the different preferred variants explained with respect to the tire constitute preferred variants of this method of manufacture.

The following portion of the description refers to the drawing and is devoted to one embodiment of the invention. In this drawing (not drawn to scale):

Figure 1:
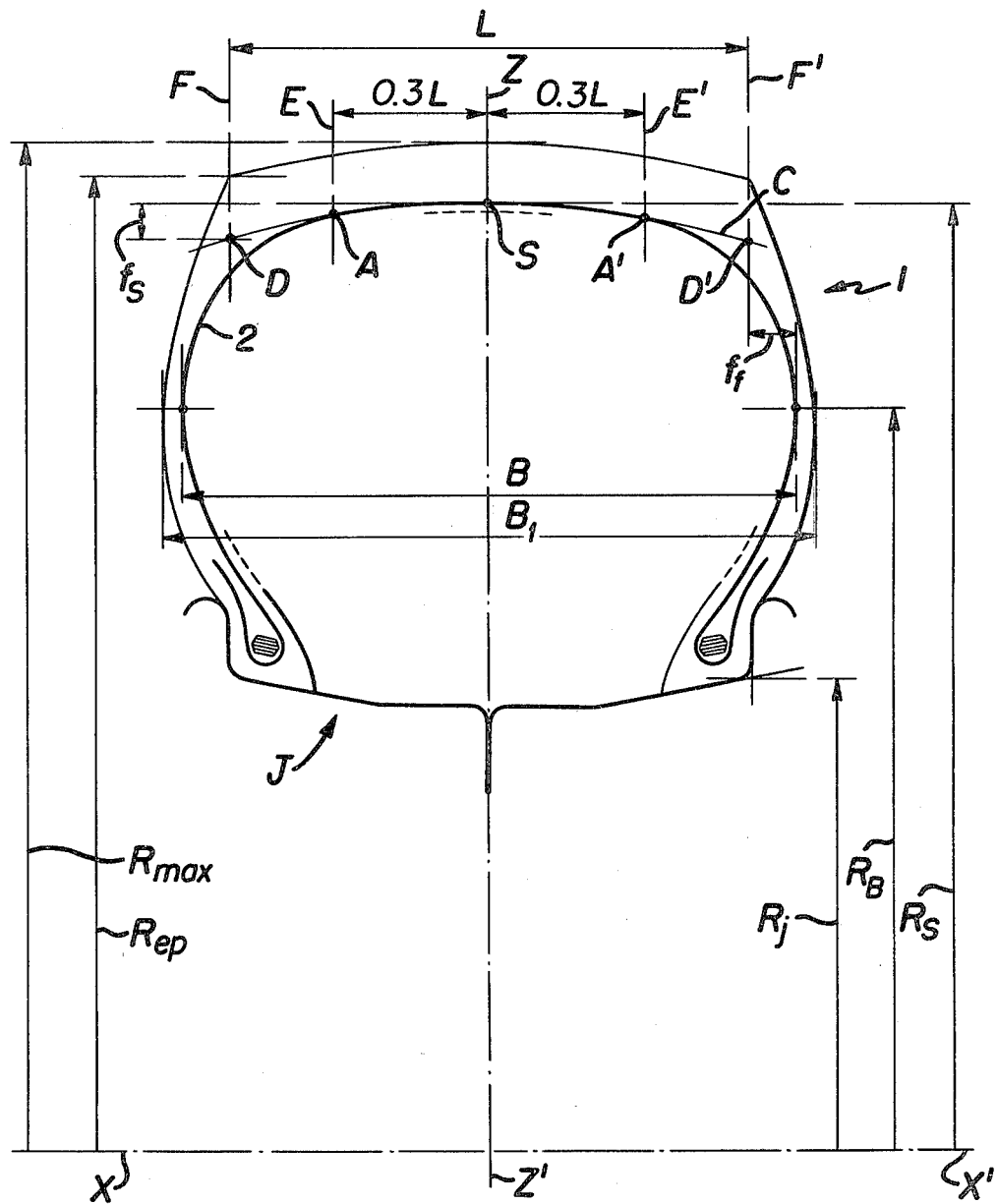
FIG. 1 is a schematic view in radial section of a tire of which only the carcass reinforcement is shown, the main purpose of this figure being to illustrate the definitions of the relative cambers of convexity of the carcass reinforcement in the crown, on the one hand, and in the sidewalls, on the other hand, and of the convexity of the tread.
Figure 2:
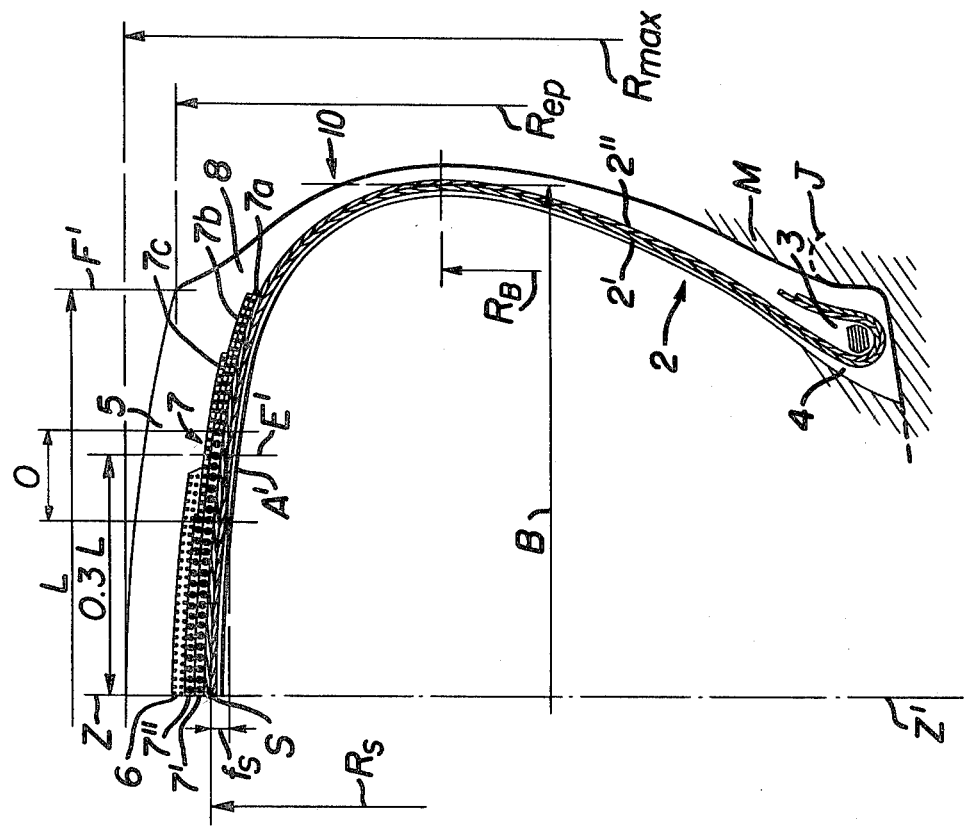
FIG. 2 is a radial half-section through a tire according to the invention in its vulcanization mold or mounted on its service rim and inflated.
Figure 3:
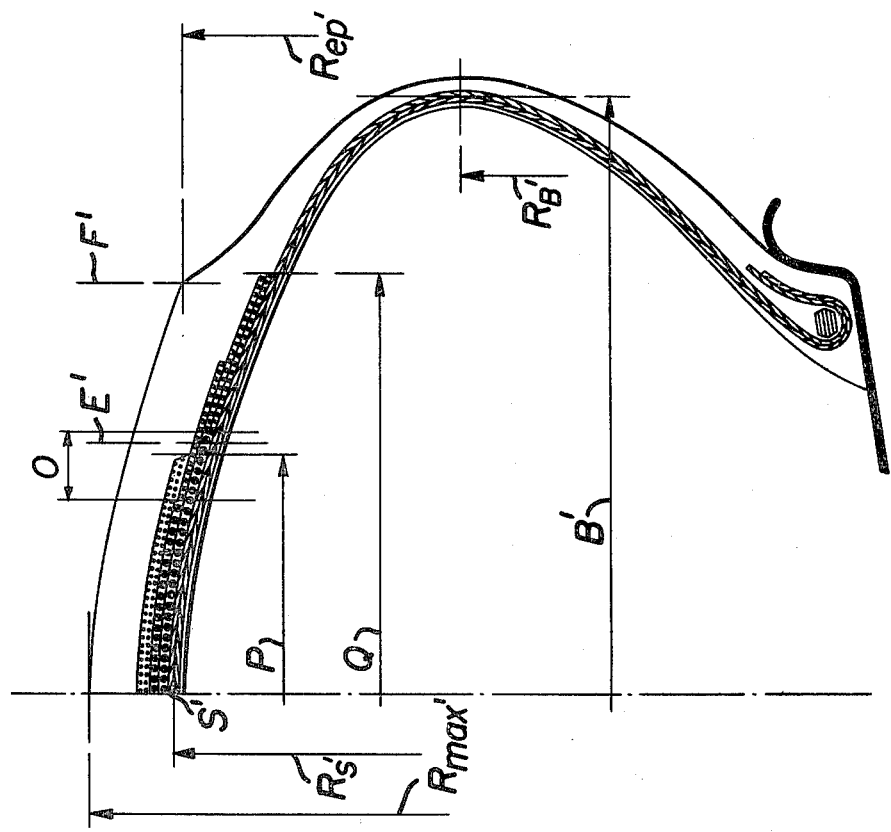
FIG. 3 is a view similar to FIG. 2 showing the tire removed from the mold and mounted on its service rim but at zero inflation pressure.

The tire 10 shown in FIGS. 2 and 3 is an airplane tire of size 750×230-15 (French Standard); it has a carcass reinforcement 2 formed in this case of two superimposed plies 2', 2" of cables of aromatic polyamide of 167×3 tex. The ends of these two plies are each turned around a metal bead ring 3 present in each of the beads 4 of the tire.

Within the tread 5 of the tire there are arranged protective plies schematically indicated at 6 and, below them, a crown reinforcement 7 applied to the carcass reinforcement 2 and the edges of which furthest from the trace of the longitudinal median plane ZZ' are located in the region of the shoulders 8 of the tire.

The contact area, measured under a load of 5850 daN and an inflation pressure of 15 bars on a flat horizontal ground, has a width L equal to 185 mm. The protective plies 6 have a width P of 115 mm; the crown reinforcement 7 has a total width Q equal to 194 mm. This crown reinforcement 7 is composed of two median plies 7', 7" and, on each side of them in axial direction, three lateral plies 7a, 7b, 7c. The median ply 7' has an axial width of 120 mm; the median ply 7" has an axial width of 90 mm. These two plies 7', 7", arranged symmetrically with respect to the trace ZZ' of the longitudinal median plane of the tire, are each composed of adjoining cables of aromatic polyamide of 330×3×3 tex, each having a diameter of 2.3 mm and a resistance to rupture of 420 daN under a relative elongation of 6.1%. These cables are arranged parallel to the equatorial plane of the tire, of trace ZZ'.

The three lateral plies 7a, 7b, 7c are juxtaposed in axial direction of the two median plies 7', 71". Their widths are equal to 38 mm, 37 mm and 35 mm, respectively. The lateral plies 7a and 7b are juxtaposed to the median ply 7'; the lateral ply 7c is juxtaposed to the median ply 7" and covers or overlaps the edge of the median ply 7' in the overlapping or common zone O over a width of 15 mm.

Each of these three lateral plies 7a, 7b, 7c is composed of adjoining cables of polyester of 110×4×2 tex, each having a diameter of 1.23 mm, a resistance to rupture of 59 daN under a relative elongation of 17%, and a coefficient of contraction under the heat at the temperature of vulcanization of the tire of between 8% and 9%. These cables are arranged parallel to the equatorial plane of the tire, of trace ZZ'.

The dimensions B, $R_B$, $R_S$, $R_{max}$ and $R_{ep}$ of the tire 10 in its mold M under pressure (FIG. 2) are indicated (in mm) in line (a) of the following table.

The corresponding dimensions B', $R_{B'}$, $R_{S'}$, $R_{max'}$ and $R_{ep'}$ of the same tire when outside its mold and not inflated (FIG. 3) are indicated (in mm) in line (b) of the following table.

Finally, lines (c) and (d) of the following table apply again to the dimensions B', $R_{B'}$, $R_{S'}$, $R_{max'}$ and $R_{ep'}$ of the tire shown in FIG. 3, but this time when the tire has been removed from its mold M, mounted on its service rim J and inflated to its service pressure (15 bars, line (c)) or to its test pressure (60 bars, line (d)).

| | B | B' | $R_B$ | $R_{B'}$ | $R_S$ | $R_{S'}$ | $R_{max}$ | $R_{max'}$ | $R_{ep}$ | $R_{ep'}$ |
|---|---|---|---|---|---|---|---|---|---|---|
| (a) | 232 | | 278 | | 359 | | 374 | | 362 | |
| (b) | | 242 | | | | | | 372.2 | | 351.3 |
| (c) | | 236 | | 285 | | 362 | | 375.2 | | 363 |
| (d) | | 235 | | | | | | 389.2 | | |

What is claimed is:

1. A tire for airplanes having a carcass reinforcement formed of at least one ply of radial cables which is anchored to at least one bead ring in each bead and a tripartite crown reinforcement radially outwards adjacent to the carcass reinforcement and having a median portion in contact, at each of its edges, with a lateral portion, each of these three portions being formed of at least one ply of textile cables which are parallel in each ply and inclined by an angle of between 0° and 30° to the circumferential direction of the tire, the carcass reinforcement of the tire when mounted on its service rim and inflated to its service pressure but not under load having a relative camber of convexity in the crown of at most 0.12, preferably between 0.04 and 0.10, and a relative camber of convexity in the sidewalls of at most 0.14, the tire thus having a quasi-rectangular meridian profile and being characterized by the fact that when it is mounted on its service rim but not inflated, its carcass reinforcement has a relative camber of convexity in the crown of at most 0.17, preferably between 0.055 and 0.15, and a relative camber of convexity in the sidewalls of at most 0.20, and a length such that after inflation its equilibrium curve at the level of the shoulders is located radially outwards of its curve in the uninflated tire, and by the fact that the median portion of the crown reinforcement is formed of cables whose extensibility is low, preferably close to zero, and which have a low, preferably zero, coefficient of contraction under the heat at the temperature of vulcanization of the tire, while the cables of the lateral portions of the crown reinforcement are very extensible and have a high coefficient of contraction under the heat at the temperature of vulcanization of the tire.

2. A tire according to claim 1, characterized by the fact that in the median portion of the crown reinforcement the cables have a modulus of elasticity of between 600 and 2500 daN/mm$^2$ measured at 25% of the rupture load, a relative elongation upon rupture of between 0.1% and 8% and a coefficient of contraction under the heat at the temperature of vulcanization of the tire of less than 0.75% of their length before the vulcanization of the tire.

3. A tire according to claim 1, characterized by the fact that in the lateral portions of the crown reinforcement the cables have a modulus of elasticity of between 75 and 600 daN/mm$^2$ measured at 80% of the rupture load, a relative elongation upon rupture of between 10% and 40%, preferably between 10% and 30%, and a coefficient of contraction under the heat at the temperature of vulcanization of the tire of at least equal to 4 times the coefficient of contraction of the cables of the median portion and equal to between 3% and 15%, preferably between 6% and 10%, of their length before the vulcanization of the tire.

4. A tire according to claim 1 or 2 or 3, characterized by the fact that the median portion of the crown reinforcement has an axial width of between 30% and 80% of the width of the crown reinforcement.

5. A tire according to claim 1 or 2 or 3, characterized by the fact that each lateral portion of the crown reinforcement has an axial width of between 10% and 35% of the width of the crown reinforcement.

6. A tire according to claim 1 or 2 or 3, characterized by the fact that the median portion of the crown reinforcement is formed of plies of cables oriented at 0° with respect to the circumferential direction of the tire.

7. A tire according to claim 1 or 2 or 3, characterized by the fact that the median portion of the crown reinforcement is formed of plies of cables which are crossed symmetrically at angles of less than 30° with respect to the circumferential direction of the tire.

8. A tire according to claim 1 or 2 or 3, characterized by the fact that the lateral portions of the crown reinforcement are formed of plies of cables oriented at 0° with respect to the circumferential direction of the tire.

9. A tire according to claim 1 or 2 or 3, characterized by the fact that the lateral portions of the crown reinforcement are formed of plies of cables which are crossed symmetrically at angles of less than 25° with respect to the circumferential direction of the tire.

10. A tire according to claim 1 or 2 or 3, characterized by the fact that the radial carcass reinforcement has a relative elongation under the effect of the service pressure of between 1% and 2% of its length in the mold.

11. A tire according to claim 1 or 2 or 3, characterized by the fact that a part of the ply of each of the lateral portions or at least one of the plies of each of the lateral portions is arranged radially outwards of a median ply in the zone of contact between the lateral and median portions so as to create a zone common to the median portion and each of the lateral portions.

12. A tire according to claim 11, characterized by the fact that the common zone between each lateral portion and the median portion of the crown reinforcement has an axial width at most equal to 15% of the width of the crown reinforcement.

13. A tire according to claim 1, characterized by the fact that at least one ply of each lateral portion is extended into the sidewalls.

14. A tire according to claim 1, characterized by the fact that when the tire is mounted on its service rim but not inflated, the convexity of the tread is greater by at least 1.5%, preferably 3% to 4%, of the equatorial radius of the tire inflated to its service pressure than said convexity measured on the tire when inflated to its service pressure, said convexity measured on the tire inflated to its service pressure being between 0% and 6% of the equatorial radius of the tire.

15. A tire according to claim 1, characterized by the fact that it further comprises customary crown plies which are arranged radially outwards of the crown reinforcement.

16. A tire according to claim 15, characterized by the fact that the customary crown plies have a width approximately equal to the width of the median portion of the crown reinforcement.

17. A tire according to claim 15 or 16, characterized by the fact that the customary crown plies consist of elastic steel cables arranged at angles at least equal to 45° with respect to the circumferential direction of the tire.

18. A method for manufacturing a tire for airplanes having a carcass reinforcement formed of at least one ply of radial cables which is anchored to at least one bead ring in each bead and a tripartite crown reinforcement radially outwards adjacent to the carcass reinforcement and having a median portion in contact, at each of its edges, with a lateral portion, each of these three portions being formed of at least one ply of textile cables which are parallel in each ply and inclined by an angle of between 0° and 30° in the circumferential direction of the tire, comprising vulcanizing the tire in a vulcanization mold in which the carcass reinforcement and the crown reinforcement occupy approximately the same position as in the tire when mounted on its service rim and inflated to its service pressure but not under load, the curvature of the carcass reinforcement reaching a maximum at the shoulders and a minimum at the intersection of the carcass reinforcement with the equatorial plane of the tire, the carcass reinforcement in the tire in the vulcanization mold having a relative camber of convexity in the crown of at most 0.12, preferably between 0.04 and 0.10, and a relative camber of convexity in the sidewalls of at most 0.14; the tire thus having a quasi-rectangular meridian profile;

and further comprising using a crown reinforcement in which the cables of the median portion have a low extensibility, preferably close to zero, and have a coefficient of contraction under the heat at the temperature of vulcanization of the tire which is low, preferably zero, and in which the cables of the lateral portions are very extensible and have a high coefficient of contraction under the heat at the temperature of vulcanization of the tire;

when the tire is mounted on its service rim but not inflated, its carcass reinforcement has a relative camber of convexity in the crown of at most 0.17, preferably between 0.055 and 0.15, and a relative camber of convexity in the sidewalls of at most 0.20, and a length such that after inflation its equilibrium curve at the level of the shoulders is located radially outwards of its curve in the uninflated tire.

* * * * *